3,329,719
PROCESS FOR RECOVERING m-PHENYLENE DIAMINE
Duncan J. Crowley, Penns Grove, and Louis Spiegler, Woodbury, N.J., assignors to E. I. du Pont de Nemours and Company, Wilmington, Del., a corporation of Delaware
Filed Aug. 7, 1964, Ser. No. 388,190
8 Claims. (Cl. 260—582)

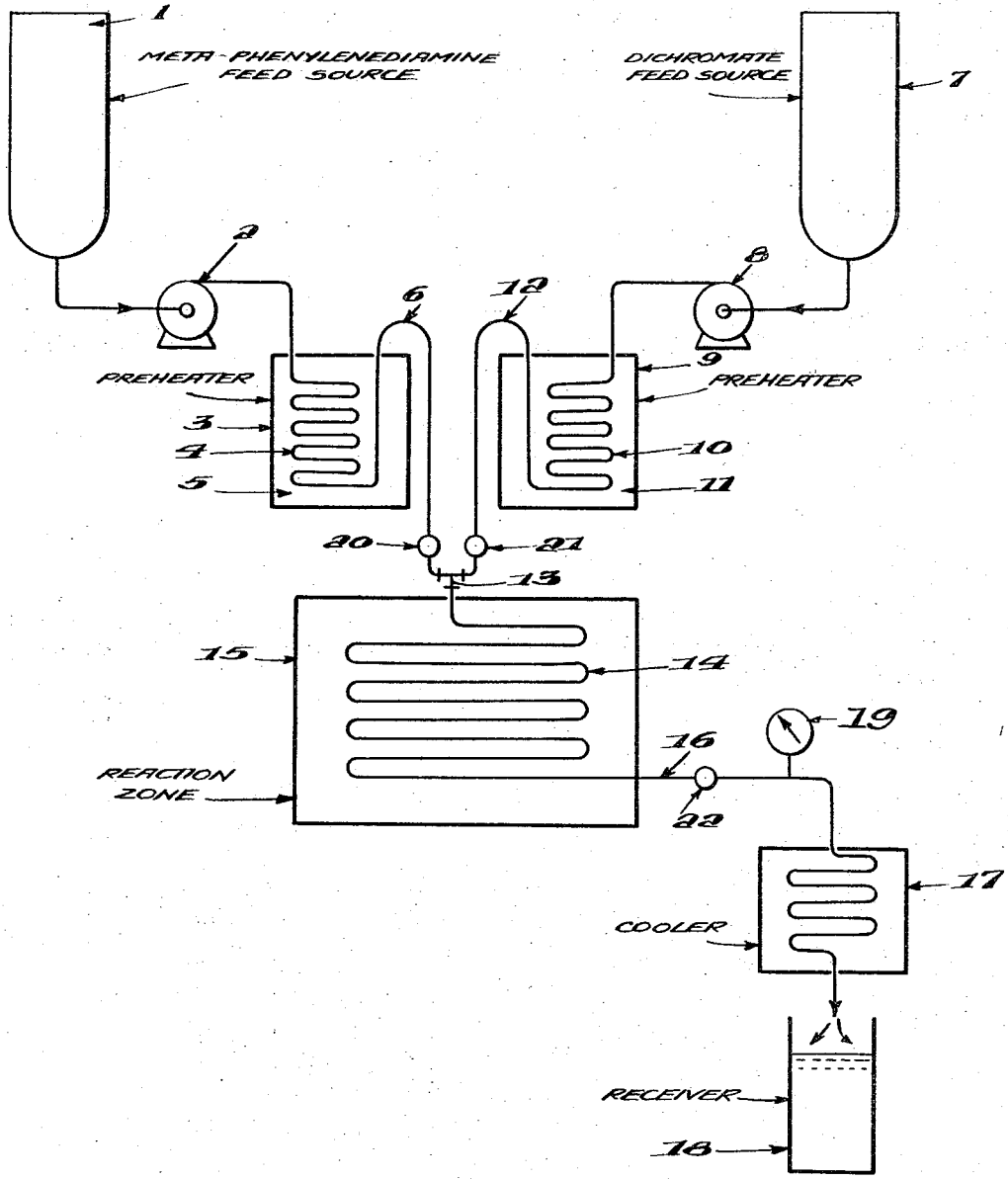

The present invention is directed to a novel process for the treatment of m-phenylenediamine to free it from objectionable trace quantities of isomeric phenylenediamines and render the treated m-phenylenediamine resistant to deterioration and discoloration in storage.

The long recognized problem of commercially producing meta-phenylenediamine having high purity and stability against progressive discoloration on exposure to ordinary atmospheric conditions has been difficult to overcome. However, the cause of the deterioration and instability of meta-phenylenediamine has been traced to the presence of impurities in the meta-phenylenediamine, particularly the isomeric impurities ortho- and para-phenylenediamines. It has thus far been considered uneconomical to obviate the occurrence of these impurities in meta-phenylenediamine by starting with rigorously purified intermediates. Rather, efforts to obtain pure and stable meta-phenylenediamine have been directed to methods for removing the accumulated impurities, especially the isomeric impurity para-phenylenediamine, from the meta-phenylenediamine after manufacture.

Recently, a method for stabilizing meta-phenylenediamine has been disclosed in U.S. Patent 2,946,822 which involves the treatment of m-phenylenediamine with an alkali dichromate at temperatures below 100° C. The patent disclosure states that alkali dichromate selectively complexes, precipitates, and thereby removes the isomeric phenylenediamine impurities. This process, however, is not entirely satisfactory in commercial practice. The reaction is slow, taking several hours at 80° C. for effective impurity removal and is not adaptable to continuous operation. The patent further discloses that use of high temperatures results in loss of selectivity and in excessive and uneconomical yield loss of m-phenylenediamine.

It is, therefore, an object of the present invention to provide a quick and efficient continuous process for the removal of isomeric impurities from meta-phenylenediamine.

It is another object to provide a novel process which will yield color-stable meta-phenylenediamine at a high production rate.

It is still another object of the present invention to provide an efficient process for the removal of isomeric impurities from meta-phenylenediamine which does not result in undue loss of the meta-phenylenediamine product.

More specifically, the present invention is directed to a process for treating color-unstable m-phenylenediamine containing from 0.05–0.5% isomeric impurities which process comprises mixing the impure diamine with an aqueous alkali metal dichromate solution in the proportions corresponding to from 5–25 moles of dichromate/mole of isomeric impurity, holding the mixture at a temperature of from 120° C. to 150° C. for from 2–10 minutes under sufficient pressure to maintain the mixture in the liquid state, and recovering m-phenylenediamine from the aqueous reaction mixture having a reduced isomeric impurity content and improved color stability.

It has been unexpectedly found that the isomeric impurities in meta-phenylenediamine can be effectively and selectively removed without suffering the undue loss of meta-phenylenediamine noted in the art by heating the impure diamine with an excess of alkali-dichromate to a temperature of from 120° C. to 150° C. for a relatively short reaction time. By this unique process the isomeric impurities are quickly and efficiently removed resulting in a high production of color-stable, purified meta-phenylenediamine product.

Meta-phenylenediamine having not more than about 0.5 mole percent isomers is readily obtained by the ordinary techniques employed for its isolation, irrespective of the method used for manufacture. It is difficult and costly, however, to reduce the impurity content to below about 0.1 to 0.2 mole percent by ordinary means. In commercial preparation of meta-phenylenediamine, nitrobenzene is first nitrated to dinitrobenzene and then converted to phenylenediamine. As described in U.S. Patent 2,946,822, such dinitrobenzene may contain up to about 15% impurities, mainly isomeric ortho- and para-dinitrobenzenes. The dinitro mixture may be converted to the corresponding mixed phenylenediamines by catalytic hydrogenation or by chemical reduction, according to known methods, and the resulting diamine composition distilled to remove the bulk of the impurities. Alternatively, the crude meta-dinitrobenzene may be subjected to one or more purification procedures. As indicated in the art, meta-phenylenediamine subsequently produced from pre-purified meta-dinitrobenzene still contains appreciable amounts of impurities and is unsatisfactory from the standpoint of storage stability requirements. Although the amount of isomeric impurities in the meta-phenylenediamine is not critical, it is preferred to reduce the amount of impurities to below 0.5% before being treated with the dichromate solution.

Sodium dichromate is normally used in this process for reasons of availability and cost, but any water-soluble dichromate, such as the lithium and potassium compounds, are operable. It is believed that the dichromate functions here as oxidant and that such action, inherent in the dichromate radical under the defined conditions, is independent of the particular metal moiety associated with it.

The amount of dichromate used in the treatment may vary within wide limits of from 5 to 25 moles of dichromate/mole of isomeric impurity. Within this range, the amount of dichromate used depends on the level of impurities in the starting meta-phenylenediamine, the process conditions such as temperature and duration of treatment, and the degree of purification desired. Although other impurities besides the isomers are known to exist in meta-phenylenediamine, the amount of dichromate used is normally based on the moles of impurity taken as phenylenediamine. A more preferred limit for the amount of dichromate utilized in the present invention is from 6 to 10 moles of dichromate/mole of isomeric impurity. The isomeric contents of the meta-phenylenediamine can be conveniently determined colorimetrically or by gas chromatographically using known procedures.

If the impurity content is not known with certainty, it usually suffices to employ from about 0.25 to 2.5 moles of dichromate for each 100 moles of meta-phenylenediamine. A more preferred range is from 0.5-1.5 moles of dichromate/100 moles of meta-phenylenediamine. Such quantities, in terms of $Na_2Cr_2O_7 \cdot H_2O$, correspond to about 0.7 to 7 parts, preferably 1.4 to 4.2 parts by weight of dichromate, for each 100 parts by weight of the diamine to be treated. Where feasible, the lower quantities of dichromate within the designated ranges are employed since use of unnecessary excesses may tend to lower the recoverable yield of diamine.

The present novel process is particularly adapted for continuous operation, and operation as such is definitely preferred. Broadly, the meta-phenylenediamine to be purified is liquefied by melting or dissolution in water, preferably the former, and is continuously and intimately mixed with water-soluble dichromate, preferably as an aqueous stream. The reactant streams may be preheated before mixing or brought to reaction temperature of from 120° C. to 150° C. on or after mixing. It is more preferred to carry out the reaction at a temperature between 120° C. and 150° C. Conveniently, molten diamine which is preheated to 120-235° C. is mixed with aqueous dichromate which is at temperatures up to about 95° C. The proportions and temperatures of said streams are such as to provide reaction mixture temperatures simply on mixing.

Since reaction temperatures are above the normal boiling point of water, the reaction mixture is confined under pressure sufficient to maintain an aqueous phase. There is no other criticality in the degree of pressure used. The proportions of water are not critical. However, to provide a mobile fluid phase for easy flow through pumps, valves, and pipelines, a 0.25 to 10% by weight solution of dichromate in water is used. It is even more preferred to use a 1 to 5% dichromate-water solution.

The residence time in the reactor for the metaphenylenediamine-dichromate mixture is from 2 to 10 minutes. However, it is more preferred to treat as rapidly as possible. Hence, the preferred residence time is from 2 to 5 minutes.

After being held at the specified conditions of temperature and time, the reaction mixture is cooled to below 100° C., e.g., 40-80° C., discharged to a receiver at atmospheric pressure, filtered to remove precipitated reaction products, and distilled, e.g., at 150-170° C. at 10-20 mm. of Hg pressure, to obtain crystalline, low-isomer-content, color-stable meta-phenylenediamine. The recovered diamine will have a reduced total ortho- and para-content of not more than 0.05% and more preferably not more than 0.015%, with not more than 0.01% (100 p.p.m.) being the para-isomer.

The continuous reactor utilized in the present invention for effectively purifying and stabilizing meta-phenylenediamine will be better understood by reference to the accompanying drawing which illustrates a representative and preferred embodiment of this continuous system.

In the drawing, the continuous reactor consists of a diamine supply tank 1, a metering device 2 for measuring the amount of diamine flowing into the system, and a preheating zone 3 consisting of coiled tubing 4 and heating bath 5. Similarly, a dichromate supply 7 feeds through a metering device 8 into preheating zone 9 consisting of coiled tubing 10 and heating bath 11. Lines 6 and 12, leaving zones 3 and 9, respectively, meet at mixing T 13 and flow into coiled pipeline reactor 14, which passes through insulated chamber 15. From the pipeline reactor 14 the reaction mixture flows via line 16 through cooler 17 and empties into receiver 18. Gauge 19 records the pressure of the effluent stream as it leaves the insulated portion of the pipeline reaction zone. Thermocouples 20 and 21 record the temperatures of the diamine and dichromate streams, respectively, as these streams enter the reaction zone, while thermocouple 22 records the temperature of the reaction mass as it leaves the reaction zone. From the receiver 18 the reaction mixture is subsequently processed by known techniques to recover a purified, highly stable meta-phenylenediamine.

Representative examples illustrating the present invention are as follows. All parts are by weight unless otherwise specified. In the examples, isomer contents were determined colorimetrically by a method based on the general conditions described in Analytical Chemistry, 7, 146 (1935) and in Colorimetric Methods of Analysis, vol. IV, 227-228, Snell and Snell, Third edition (1954), D. Van Nostrand Co., Inc., New York, N.Y.

Example I

In a stainless steel ⅛" diameter pipeline reactor, as schematically represented in the drawing, molten (105° C.) m-phenylenediamine analyzing 0.10% ortho-phenylenediamine and 0.10% para-phenylenediamine was pumped at the rate of about 100 cc./minute through a preheater coil immersed in a 150° C. oil bath. Simultaneously a 4 weight percent solution of $Na_2Cr_2O_7 \cdot 2H_2O$ in water at 25° C. was pumped at a rate of 90 cc./minute through another preheater coil also heated in a 150° C. oil bath. The two streams, molten diamine at 132° C. and aqueous dichromate at 126° C., were mixed in a common line on leaving the preheater zones and immediately passed through an insulated zone (50 coils=240 feet) to maintain reaction temperature. The temperature of the reaction mixture at the end of the insulated zone was about 120° C. and the mixture at that point was under a pressure about 50-100 p.s.i.g. The pipeline from the insulated zone passed through a cooler at 0° C. which reduced the reaction mixture flowing within the pipeline to a temperature of about 50° C. After the cooler, the pipeline emptied into a receiver at room temperature and atmospheric pressure.

In 8 minutes of operation, 28 grams of $$Na_2Cr_2O_7 \cdot 2H_2O$$

and 820 grams of diamine were fed into the continuous reactor and 1550 grams of reaction mass collected. The dichromae/impurity molar ratio was 6.19/1 and the dichromate/diamine molar ratio was 1.24/100. The residence time in the reactor was 3.2 minutes (based on a volume of 576 cc. for the 240' x ⅛" pipeline).

The reaction mass was filtered to remove brown sludge 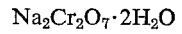 (15:6 grams) and the filtrate distilled. Water was removed first at 50 mm. of Hg pressure, then m-phenylenediamine was collected at about 150° C. and 10 mm. of Hg.

The recovered diamine amounted to 802 grams, corresponding to a 97.7% recovery based on 820 grams charged, and contained 45 p.p.m. ortho- and 11 p.p.m. para-isomer, corresponding to a 97.3% reduction in total isomer content.

The above procedure was repeated with several impure m-phenylenediamine charges. Purification and stability results obtained for the charges before and after the dichromate treatment and under varying dichromate treatment conditions are compared below in Table I. The stability comparison test in Table I designated in terms of storage life was measured in the following manner.

The recovered snow-white crystalline meta-phenylenediamine solids were stored in a screwcap clear glass bottles under ordinary room conditions. Periodically a portion of the solid was removed and a 2% solution prepared with a suitable solvent such as methanol. The optical density of the solution was measured at 400 millimicrons in a model DU Beckman spectrophotometer. The storage life of the sample was computed as the time required for the optical density to increase from an initial value of 0.01 (essentially colorless) to 0.2 (discolored). By commercial standards, an indicated storage life of at least 50 days is rated as acceptable, 100 good, and 150 to 200 days excellent.

TABLE I

[Purification of m-phenylenediamine (MPD) by high temperature (125±5° C.) dichromate treatment [1]]

| Test No. | Before treatment ||| Dichromate Treatment, Moles Dichromate/ 100 Moles MPD | Percent Recovery (Yield) | Residence Time, Min. | Dichromate Treatment, Moles Dichromate/ 100 Moles Isomers | Percent Removal of Isomers | After treatment |||
|---|---|---|---|---|---|---|---|---|---|---|---|
| | Isomer Content || Storage Life, Days | | | | | | Isomer Content || Storage Life, Days |
| | OPD, p.p.m. | PPD, p.p.m. | | | | | | | OPD, p.p.m. | PPD, p.p.m. | |
| 1 | 100 | 500 | 1 | 1.27 | 97.6 | 4.58 | 20.80 | 98.2 | 0 | 11 | 150 |
| 2 [2] | 1,000 | 1,000 | 1 | 1.24 | 97.7 | 3.20 | 6.19 | 97.3 | 45 | 11 | 200 |
| 3 | 100 | 500 | 1 | 0.30 | 98.8 | 2.95 | 5.00 | 95.5 | 14 | 13 | 150 |
| (4) | 100 | 500 | 1 | 0.33 | 99.0 | 1.76 | 5.59 | 69.5 | 44 | 140 | 50 |
| (5) | 100 | 500 | 1 | 0.11 | 98.6 | 3.19 | 1.77 | 59.6 | 19 | 227 | 65 |
| (6) | 100 | 1,000 | 1 | 0.22 | 98.3 | 1.10 | 1.93 | 69.0 | 25 | 322 | 16 |

[1] Reactor=227' x ⅛" stainless stell tubing=545 cc.
[2] Reactor=240' x ⅛" stainless steel tubing=576 cc.

Tests 4, 5 and 6 (in parentheses above) were carried out under conditions which are not totally within the defined limits of the subject process and are shown for comparison. Test 4 is low in reactor residence time, whereas test 5 is low in the amount of dichromate used. Test 6 is low in both the amount of dichromate used and in residence time in the reactor.

Control tests were made using the same equipment and procedure but without dichromate. These tests showed that the recovery procedure entailed mechanical losses of about 1%. Thus, the meta-phenylenediamine loss attributable to the dichromate reaction itself is small in the present unique high-temperature process.

In view of the reaction conditions given in Table I, the data show that meta-phenylenediamine treated according to the process of the present invention has greater purity as measured by its isomer content and greater resistance to discoloration in storage than untreated meta-phenylenediamine or meta-phenylenediamine treated under conditions other than those defined by the present invention.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or priviledge is claimed are defined as follows:

1. A process for treating m-phenylenediamine containing from 0.05% to 0.5% isomeric impurities which process comprises mixing said impure diamine with an aqueous solution of from 5 to 25 moles of an alkali metal dichromate per mole of impurity, holding said mixture at a temperature of from about 120° C. to 150° C. for from 2 to 10 minutes under a pressure sufficient to maintain the mixture in a liquid state, and recovering m-phenylenediamine having a reduced isomer content and improved color-stability from the aqueous reaction mixture.

2. A process for treating m-phenylenediamine containing from 0.05% to 0.5% isomeric impurities which process comprises mixing said impure diamine with an aqueous solution of from 0.25 to 2.5 moles of an alkali metal dichromate per 100 moles of m-phenylenediamine, holding said mixture at a temperature of from about 120° C. to 150° C. for from 2 to 10 minutes under a pressure sufficient to maintain the mixture in a liquid state, and recovering m-phenylenediamine having a reduced isomer content and improved color-stability from the aqueous reaction mixture.

3. A process for treating m-phenylenediamine containing from 0.05% to 0.5% isomeric impurities which process comprises mixing said impure diamine with an aqueous solution of from 5 to 25 moles of an alkali metal dichromate per mole of impurity, holding said mixture at a temperature of from about 120° C. to 130° C. for from 2 to 10 minutes under a pressure sufficient to maintain the mixture in a liquid state, and recovering m-phenylenediamine having a reduced isomer content and improved color-stability from the aqueous reaction mixture.

4. The process of claim 1 wherein said process is carried out continuously.

5. The process of claim 1 wherein the mole ratio of dichromate added to the diamine is about 6 moles of dichromate per mole of isomeric impurities.

6. The process of claim 1 wherein the reaction time is from 2 to 5 minutes.

7. The process of claim 1 wherein the m-phenylenediamine recovered from the aqueous reaction medium contains not more than from 0.015 to 0.05% of said isomeric impurities.

8. The process of claim 2 wherein the mole ratio of the dichromate added to the diamine is from about 0.5 to 1.5 moles of dichromate per 100 moles of diamine.

No references cited.

CHARLES B. PARKER, *Primary Examiner.*

NELSON A. WICZER, *Assistant Examiner.*